United States Patent [19]

Poyner et al.

[11] Patent Number: 5,686,536
[45] Date of Patent: Nov. 11, 1997

[54] SULFUR-CONTAINING AMINE COMPOSITIONS AND AGENTS FOR VULCANIZING RUBBER

[75] Inventors: William Raymond Poyner, Worcestershire; Khirud Behari Chakraborty; Ranvir Singh Virdi, both of Birmingham, all of United Kingdom

[73] Assignee: Robinson Brothers Limited, West Bromwich, United Kingdom

[21] Appl. No.: 544,253

[22] Filed: Oct. 17, 1995

Related U.S. Application Data

[63] Continuation of Ser. No. 167,233, Dec. 14, 1993, abandoned.

[30] Foreign Application Priority Data

Dec. 18, 1992 [GB] United Kingdom .................. 9226384

[51] Int. Cl.$^6$ ................................................ C08C 19/20
[52] U.S. Cl. ..................... 525/331.8; 525/332.7; 525/351
[58] Field of Search ..................... 525/331.8, 329.3, 525/332.6, 332.7

[56] References Cited

U.S. PATENT DOCUMENTS 2,356,163 8/1944 Jones ........................................ 525/351
3,356,657 12/1967 Walker ..................................... 525/351
4,202,952 5/1980 Onizawa ................................... 525/374

FOREIGN PATENT DOCUMENTS 1232 1/1973 Japan .

OTHER PUBLICATIONS

Chemical Abstracts, vol. 80, No. 4, Abstract 16145 p Abstract of Japanese Pat. Pub. 48–1232.

*Primary Examiner*—Christopher Henderson
*Attorney, Agent, or Firm*—George W. Rauchfuss, Jr.

[57] ABSTRACT

A vulcanizable composition comprises sulfur-vulcanizable rubber, sulfur or a sulfur-donor, a zinc compound, and a sulfur-containing amine of the formula $$R^1-S_n-R-NR^2R^3$$

wherein R is a divalent radical comprising a chain of at least 2 C atoms, $R^1$ is an organic radical, and $R^2$ and $R^3$ are each H or an organic radical, provided that $NR^2R^3$ is not $NH(C_{1-6}$ alkyl), and n is an integer, or a salt thereof, provided that the amine is not 3-(methylthio)propylamine. The amine is preferably cystamine.

1 Claim, No Drawings

SULFUR-CONTAINING AMINE COMPOSITIONS AND AGENTS FOR VULCANIZING RUBBER

This Application is a continuation of application Ser. No. 08/167,233, filed Dec. 14, 1993, now abandoned.

FIELD OF THE INVENTION

This invention relates to vulcanizable compositions and to agents for vulcanizing rubber.

BACKGROUND OF THE INVENTION

In recent years, environmental and legislative pressures have made it necessary to replace many of the active agents that have been widely used in rubber technology. One particular area of concern has been the use of compounds, usually based on secondary amines, that are extremely effective accelerators but which can react to give toxic nitrosamines. Various compounds have been proposed, to avoid this problem. For example, the use of dialkyldithio-carbamates and xanthates is described in EP-A-0184301, tetrabenzylthiuram sulfides in EP-A-0283552, EP-A-0284649 and EP-A-0284650, and the combination in EP-A-0413504.

Although these compounds are effective, the degree of cure that they provide is usually lower than that provided by conventional secondary amine accelerators. One such accelerator is 2-mercaptoimidazoline (also known as ethylene thiourea) that is both nitrosatable and carcinogenic.

Chem. Abs. 80 (1974) 16145p discloses that diaminodisulfides, e.g. cystamine, provide increased scorch times when used in halogen-containing poller rubbers. The particular example of a composition of this type comprises 100 parts polyepichlorohydrin rubber, 5 parts $Pb_3O_4$, 50 parts carbon black, 1.5 parts 2-mercapto-imidazoline and 1 part 2,2'-diaminodiphenyldisulfide.

SUMMARY OF THE INVENTION

It has now been found that diaminoalkyldisulfides such as cystamine, and other compounds having both an amine group and at least one sulfur atom, are useful primary and, more especially, secondary accelerators in sulfur-vulcanizable systems. As amines, such compounds do increase the rate of cure of rubber, but the surprising discovery behind the present invention is that the cured rubber is stable, i.e. it does not suffer either reversion or post-vulcanization once the cure has reached its plateau. According to the present invention, therefore, a vulcanizing agent for a sulfur-vulcanizable rubber (i.e. not a halogen-containing polymer rubber) comprises sulfur, zinc oxide or another zinc compound, and a sulfur-containing amine of the formula $$R^1-S_n-R-NR^2R^3$$

wherein R is a divalent radical comprising a chain of at least 2 C atoms, $R^1$ is an organic radical, and $R^2$ and $R^3$ are each H or an organic radical, provided that $NR^2R^3$ is not $NH(C_{1-6}$ alkyl), and n is an integer, or a salt thereof. Perhaps because of its tendency to decompose into the relatively stable compounds methylmercaptan and allylamine at vulcanizing temperatures, however, 3-(methylthio)propylamine is unsuitable for use in the invention; its use causes reversion.

DESCRIPTION OF THE INVENTION

The sulfur-containing amine used in the present invention apparently has both stabilising/anti-oxidant properties as well as acting as an accelerator. Particularly if anti-oxidant properties are required, monosulfides (n=1) may be preferred. Especially stable compounds of this type are those in which $R^1$ is a long-chain alkyl group, e.g. of up to 20 C atoms. Thus, for example, the amine may be 2-(decylthio) ethylamine.

In order to obtain the accelerating effect associated with the amine group, it is often preferred that $R^1$ should include another $NR^2R^3$ group. Preferred diamines of this type have the formula $S_n(RNR^2R^3)_2$. While the amount of the amine that is used in the present invention may be 0.1 to 2, and preferably 0.2 to 1, parts by weight by 100 parts rubber, these ranges are particulary suitable for diamines; monoamines may be used in correspondingly larger amounts.

The divalent group R is preferably a straight-chain alkylene radical, e.g. $C_{2-8}$ alkylene, and preferably $-CH_2CH_2-$. R may also be aromatic; compounds such as 2,2'-diaminophenyldisulfide have good anti-oxidant properties.

While n may be, for example, up to 4, e.g. 1 as indicated above, it is preferably 2. Accordingly, preferred compounds for use in the invention are diaminoalkyldisulfides, of which cystamine is the simplest example.

The amines used in the invention may be secondary amines, with the given proviso. An example of a suitable secondary amine is di[2-(N-(2-benzthiazyl)amino)ethyl] disulfide. When $R^2$ is H, R may be, for example, $-CSSM$ (M=Na or ½ Zn), $-SHet$ (Het=2-benzthiazyl or 2-thiazolinyl), or benzyl.

It is also possible to use tertiary amines, i.e. in which $R^2$ and $R^3$ are each organic radicals, e.g. $C_{1-8}$ alkyl. One such compound is tetramethylcystamine, of which a given amount may be less effective than cystamine, but which has the advantage over cystamine of being more compatible with rubber.

As for cystamine, it is generally preferred that $R^2$ and $R^3$ are each H, i.e. the amine is a primary amine. Further examples of amines that can be used in the invention are 3,3'-dithiobispropylamine and also salts of the amines. Suitable salts are those formed with stearic or lauric acid or carbon dioxide.

Cystamine itself is a liquid at ambient temperatures. It may be used as such, especially with latex rubber, but, for ease of handling, it may be encapsulated. Advantages associated with the use of cystamine in particular are that it gives no objectionable odours and provides few problems during mill mixing. It acts as an effective post-vulcanization stabiliser in addition to accelerators, giving high rates and states of cure of vulcanizates, without reversion, and hence good rheological and physical properties. Further, since cystamine is a primary amine, its use does not produce stable nitrosamines.

If the given amine, e.g. cystamine is used, in accordance with the invention, in order to boost the effect of a primary accelerator, that accelerator can be relatively non-toxic. In particular, primary accelerators can be used that do not react to give toxic nitrosamines.

The cystamine or other sulfur-containing amine is effective in a wide range of elastomers, except chloroprene and other halogen-containing polymer rubbers. Examples of rubbers in which it can be used are natural, nitrile, butyl, Hypalon, SBR and EPDM rubbers. The rubber may be in dry or latex form. Nitrile rubbers exemplify rubbers that are generally resistant to reversion; here and in other cases, reversion resistance may not be a primary object of the present invention, but advantages are then still associated with, for example, reduced toxicity.

The sulfur-containing amine functions as a secondary accelerator for a variety of primary accelerators such as dithiocarbamates, thiurams, thiazoles and sulfenamides. Thus, for example, compounds such as tetrabenzylthiuram disulfide or tetrasulfide, which have been proposed for use in low-nitrosamine curing systems but which are only moderate accelerators, can be boosted so that cures are achieved which match those obtained using accelerators based on amines which can give rise to nitrosamines and are therefore listed as dangerous. The general formulae and specific examples of other such accelerators whose performance can be boosted in accordance with the invention are given in EP-A-0184301, EP-A-0413504 and U.S. patent application Ser. No. 08/120,041, filed Sep. 10, 1993, the contents of which are incorporated herein.

As indicated above, the vulcanizing agent should include a zinc compound. This may be zinc oxide or a zinc complex such as diammine-diisocyanatozinc. Alternatively, or in addition, zinc may be provided as a zinc compound that can act as a primary accelerator. In particular, zinc-containing accelerators such as the zinc salt of 2-mercaptobenzthiazole, zinc dibenzyldithiocarbamate or zinc diisononyldithiocarbamate, or an analogue thereof, may be used; another such compound is zinc dibutyldithiophosphate, although it is an advantage of the present invention that, if desired, the use of phosphorus-containing compounds can be avoided.

Without wishing to be bound by theory, the present invention may depend on the interaction of the sulfur-containing amine and sulfur. A complex or reaction product of the two may be used, as may a complex of the amine and the zinc compound. Alternatively, the amine may be complexed with any other component of the composition, as in the case of a 2-mercaptobenzthiazole:cystamine complex. The sulfur may be provided as elemental sulfur or in an available form, i.e. in a sulfur donor such as a thiuram or dithiodimorpholine.

The following Examples 1–5, 7, 10, 12, 14, 16, 21, 24–26, 28, 30 and 32 illustrate compositions of the invention and their use. Examples 6, 8, 9, 11, 13, 15, 17–20, 22, 23, 27, 29 and 31 are given for the purposes of comparison.

In all formulations, amounts are given in parts by weight (unless otherwise specified). The vulcanization temperature was 160° C. (unless otherwise specified). The following abbreviations apply:
ZBeD=zinc dibenzyldithiocarbamate
ZDNC=zinc diisononyldithiocarbamate
MBT=2-mercaptobenzthiazole
DPG=1,3-diphenylguanidine
P25=dipentamethylenethiuram tetrasulfide
PPD=piperidinium pentamethylene dithiocarbamate
DDZ=diamminediisocyanatozinc
SMR=standard Malaysian rubber
SBR=styrene-butadiene rubber
NR=natural rubber
NR05=100 parts NR, 5 parts ZnO, 1 part stearic acid, 1 part antioxidant WSP, 50 parts precipitated coated calcium carbonate, 5 parts SRF black Results are expressed in terms of RH (cure rate), MH (maximum torque) and reversion. Rheometer curves give RH (%) as that part of the rheometer trace where the graph is climbing; MH indicates the maximum cure (kg.cm). Reversion (%) is calculated from $(1-MH^1/MH^2)\times 100$, where $MH^1$ and $MH^2$ are respectively the initial and final maximum torque values.

EXAMPLES 1 TO 23

The formulations and results of these Examples are given in Tables 1 to 3.

Table 1 (Examples 1 to 5) shows the effect of cystamine as a primary accelerator. In this case only cystamine and sulfur are used to cure rubber, to different extents depending on the level of sulfur at a constant level of cystamine.

Table 1 (Examples 6 to 8) shows that cystamine needs ZnO for vulcanization in the presence of sulfur. Although it has also been shown that stearic acid is not essential for the vulcanization of rubber with cystamine in the presence of sulfur, Example 8 shows that cystamine does not act as a vulcanizing agent, i.e. it is not capable of curing rubber in the absence of sulfur.

Table 2 shows that cystamine and its carbamate act as effective secondary accelerators in combination with dithiocarbamates and thiurams.

Table 3 (which repeats results for Examples 11 and 12 given in Table 2) compares the effectiveness of cystamine with other activators/boosters. Cystamine shows faster rates and high states of cure, with minimum reversion. Further comparison of Examples 11, 12 and 17 to 23 shows the superior physical and heat-ageing properties obtained with vulcanizates containing cystamine compared to those using DDZ or DPG.

EXAMPLE 24

The behaviour of cystamine (Example 12, see above) and N,N,N',N'-tetramethylcystamine (Example 24) as primary and secondary accelerators respectively was compared. In both cases, N,N,N',N'-tetramethylcystamine shows lower activity than cystamine. However, processing safety with N,N,N',N'-tetramethylcystamine is somewhat higher.

EXAMPLES 25 AND 26

Formulations of 162 parts NR05, 0.5 part S and 0.5 part cystamine or 3-(aminopropyl)disulfide (respectively Examples 25 and 26) showed similar curing rates and states.

EXAMPLES 27 AND 28

Hypalon (100 parts) was formulated with 2.67 parts nickel dibutyldithiocarbamate and 2.05 parts P25 (Example 27). This conventional formulation had somewhat lower rate and state of cure than when the Hypalon was formulated with 2.67 parts nickel diisononyldithiocarbamate, 2.91 parts TBzTD, 0.5 part cystamine, 0.5 part S and 3.0 parts pentaerythritol.

EXAMPLES 29 AND 30

Formulations of 100 parts SBR, 50 parts carbon black, 12 parts processing oil, 5 parts ZnO, 0.4 parts S, 0.7 parts P25 and 1.0 part PPD or cystamine (respectively Examples 29 and 30) showed similar curing rates and states. The vulcanization temperature was 120° C. The results are shown in Table 4.

EXAMPLES 31 AND 32

A formulation of 100 parts EPDM rubber, 1.2 parts S and 5 parts of a dithiocarbamate/thiazole/sulfenamide blend (Example 31) was compared with the same formulation additionally containing 0.5 part cystamine free base (Example 32). The formulations were cured at 180° C. The results are shown in Table 4; the formulation of Example 32 was a fast-curing, low-nitrosamine cure system, exhibiting little or no reversion.

TABLE 1

| Example | 1 | 2 | 3 | 4 | 5 | 6 | 7 | 8 |
|---|---|---|---|---|---|---|---|---|
| SMR | 100 | 100 | 100 | 100 | 100 | 100 | 100 | 100 |
| ZnO | 5 | 5 | 5 | 5 | 5 | — | 5 | 5 |
| Cystamine | 0.5 | 0.5 | 0.5 | 0.5 | 0.5 | 1 | 1 | 3 |
| S | 2.5 | 1.2 | 0.83 | 0.43 | 0.21 | 2.5 | 2.5 | — |
| MBT | — | — | — | — | — | 1 | 1 | — |
| Stearic Acid | — | — | — | — | — | 1 | 1 | 1 |
| RH | 0.06 | 0.04 | 0.04 | 0.02 | 0.01 | 0.06 | 0.52 | no cure |
| MH | 46.3 | 38.8 | 32.4 | 21.5 | 12.9 | 23.5 | 71.8 | no cure |

TABLE 2

| Example | 9 | 10 | 11 | 12 | 13 | 14 | 15 | 16 |
|---|---|---|---|---|---|---|---|---|
| NRO5 | 162 | 162 | 162 | 162 | 162 | 162 | 162 | 162 |
| ZBeD | 0.8 | 0.8 | 0.8 | 0.8 | — | — | — | — |
| ZDNC | — | — | — | — | 0.8 | 0.8 | — | — |
| TBzTD | — | — | — | — | — | — | 3 | 3 |
| Cystamine | — | — | — | 0.5 | — | 0.5 | — | 0.5 |
| Cystamine carbamate | — | 0.5 | — | — | — | — | — | — |
| S | 2.5 | 2.5 | 1.5 | 1.5 | 1.5 | 1.5 | 0.8 | 0.8 |
| RH | 0.55 | 0.94 | 0.39 | 0.73 | 0.23 | 0.58 | 0.15 | 0.75 |
| MH | 35.9 | 78.2 | 30.1 | 71.2 | 25.5 | 69.2 | 43.4 | 56.7 |

TABLE 3

| Example | 11 | 17 | 18 | 12 | 19 | 20 | 21 | 22 | 23 |
|---|---|---|---|---|---|---|---|---|---|
| NRO5 | 162 | 162 | 162 | 162 | 162 | 162 | 162 | 162 | 162 |
| DPG | — | 0.5 | — | — | — | — | — | — | — |
| ZBeD | 0.8 | 0.8 | 0.8 | 0.8 | 0.8 | 0.8 | 0.55 | 0.55 | — |
| DDZ | — | — | 0.5 | — | — | — | — | 0.5 | — |
| S | 1.5 | 1.5 | 1.5 | 1.5 | 1.5 | 1.5 | 2.5 | 2.5 | 2.5 |
| PEG 4000 | — | — | — | — | 0.5 | — | — | — | — |
| Cystamine | — | — | — | 0.5 | — | — | 0.5 | — | — |
| triethanolamine | — | — | — | — | — | 0.5 | — | — | — |
| 1,6-hexanediamine | — | — | — | — | — | — | — | — | 0.5 |
| RH | 0.39 | 0.78 | 0.89 | 0.71 | 0.34 | 0.60 | 0.70 | 0.55 | 0.59 |
| MH | 30.1 | 51.2 | 52.0 | 71.2 | 29.6 | 45.4 | 78.1 | 60.8 | 78.9 |
| Reversion | 11.5 | 24.4 | 17.8 | 0.0 | 12.0 | 37.8 | 3.0 | 14.3 | 13.2 |

TABLE 4

| Example | 29 | 30 | 31 | 32 |
|---|---|---|---|---|
| RH | 0.01 | 0.03 | 0.53 | 0.61 |
| MH | 45.3 | 53.8 | 33.1 | 42.9 |

What we claim is:

1. A vulcanizable composition comprising sulfur-vulcanizable rubber; a component selected from the group consisting of sulfur and sulfur-donors; a zinc compound; and a sulfur-containing amine, wherein said sulfur-containing amine is cystamine or a salt thereof.

* * * * *